US009802394B2

(12) United States Patent
Cavacas et al.

(10) Patent No.: US 9,802,394 B2
(45) Date of Patent: Oct. 31, 2017

(54) MACHINE DIRECTION ORIENTED FILM FOR LABELS

(71) Applicant: BOREALIS AG, Vienna (AT)

(72) Inventors: Paulo Cavacas, Coutada (PT); Gerhard Schuster, Engerwitzdorf (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/022,671

(22) PCT Filed: Oct. 8, 2014

(86) PCT No.: PCT/EP2014/071559
§ 371 (c)(1),
(2) Date: Mar. 17, 2016

(87) PCT Pub. No.: WO2015/052246
PCT Pub. Date: Apr. 16, 2015

(65) Prior Publication Data
US 2016/0229158 A1    Aug. 11, 2016

(30) Foreign Application Priority Data

Oct. 11, 2013    (EP) .................................... 13188255

(51) Int. Cl.
| | | |
|---|---|---|
| B32B 27/08 | (2006.01) | |
| B32B 27/32 | (2006.01) | |
| B32B 7/02 | (2006.01) | |
| B32B 37/00 | (2006.01) | |
| B29C 55/28 | (2006.01) | |
| B32B 1/02 | (2006.01) | |
| B29C 55/06 | (2006.01) | |
| B29C 55/04 | (2006.01) | |
| B29L 9/00 | (2006.01) | |
| B29C 47/06 | (2006.01) | |
| B29L 31/00 | (2006.01) | |

(52) U.S. Cl.
CPC .............. *B32B 27/08* (2013.01); *B29C 55/06* (2013.01); *B29C 55/28* (2013.01); *B32B 1/02* (2013.01); *B32B 27/32* (2013.01); *B29C 47/065* (2013.01); *B29C 55/04* (2013.01); *B29K 2023/06* (2013.01); *B29K 2995/0051* (2013.01); *B29L 2009/00* (2013.01); *B29L 2031/744* (2013.01); *B32B 7/02* (2013.01); *B32B 2250/03* (2013.01); *B32B 2250/242* (2013.01); *B32B 2250/40* (2013.01); *B32B 2307/406* (2013.01); *B32B 2307/412* (2013.01); *B32B 2307/516* (2013.01); *B32B 2307/518* (2013.01); *B32B 2307/75* (2013.01); *B32B 2519/00* (2013.01)

(58) Field of Classification Search
None
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |

(Continued)

FOREIGN PATENT DOCUMENTS

| | | |
|---|---|---|
| CN | 101563226 A | 11/1997 |
| CN | 1248198 A | 3/2000 |
| CN | 1267310 A | 9/2000 |
| CN | 1684988 A | 10/2005 |
| CN | 1701081 A | 11/2005 |
| CN | 1823106 A | 8/2006 |
| CN | 101573231 A | 11/2009 |
| CN | 101772376 A | 7/2010 |
| CN | 101903103 A | 12/2010 |
| CN | 102869719 A | 1/2013 |

(Continued)

OTHER PUBLICATIONS

Provisional Technical Data Sheet on Lumicene mPE M5510 EP, Aug. 2013.*
Abiru et al., "Microstructural Characterization of Propylene-Butene-1 Copolymer Using Temperature Rising elution Fractionation," *J. Appl. Polymer Sci* 68:1493-1501 (1998).

(Continued)

*Primary Examiner* — Jeff Vonch
(74) *Attorney, Agent, or Firm* — Leydig, Voit & Mayer, Ltd.

(57) ABSTRACT

Machine direction oriented multilayer film suitable for preparing labels, comprising a core layer of a bimodal terpolymer and two outer layers comprising HDPE.

15 Claims, No Drawings

(56) References Cited

U.S. PATENT DOCUMENTS

| | | | |
|---|---|---|---|
| 5,504,172 A | 4/1996 | Imuta et al. | |
| 5,529,850 A | 6/1996 | Morini et al. | |
| 5,539,067 A | 7/1996 | Parodi et al. | |
| 5,618,771 A | 4/1997 | Parodi et al. | |
| 5,691,043 A | 11/1997 | Keller et al. | |
| 5,693,838 A | 12/1997 | Sangokoya et al. | |
| 5,723,560 A | 3/1998 | Canich | |
| 5,731,253 A | 3/1998 | Sangokoya | |
| 5,731,451 A | 3/1998 | Smith et al. | |
| 5,744,656 A | 4/1998 | Askham | |
| 6,001,766 A * | 12/1999 | Kissin | B01J 31/143 502/103 |
| 6,316,562 B1 | 11/2001 | Munck et al. | |
| 6,322,883 B1 | 11/2001 | Williams | |
| 6,365,682 B1 | 4/2002 | Alastalo et al. | |
| 6,586,528 B1 | 7/2003 | Delaite et al. | |
| 6,642,317 B1 | 11/2003 | Delaite et al. | |
| 7,319,125 B2 | 1/2008 | Arjunan et al. | |
| 7,342,078 B2 | 3/2008 | Schottek et al. | |
| 7,354,979 B2 | 4/2008 | Brant et al. | |
| 7,378,472 B2 | 5/2008 | Fell et al. | |
| 7,429,634 B2 | 9/2008 | Brant et al. | |
| 7,569,651 B2 | 8/2009 | Schottek et al. | |
| 8,709,561 B2 | 4/2014 | Bernreitner et al. | |
| 8,779,062 B2 | 7/2014 | Paavilainen et al. | |
| 8,889,792 B2 | 11/2014 | Paavilainen et al. | |
| 9,181,423 B2 | 11/2015 | Kock et al. | |
| 9,243,137 B2 | 1/2016 | Reichelt et al. | |
| 2003/0144426 A1* | 7/2003 | Williams | C08L 23/0815 525/270 |
| 2003/0149180 A1* | 8/2003 | Van Dun | C08F 10/02 525/240 |
| 2003/0149199 A1 | 8/2003 | Schottek et al. | |
| 2004/0033349 A1* | 2/2004 | Henderson | B32B 27/32 428/304.4 |
| 2004/0044154 A1* | 3/2004 | Kuo | C08F 10/00 526/113 |
| 2004/0058802 A1* | 3/2004 | Knoeppel | C08F 10/00 502/102 |
| 2004/0058803 A1* | 3/2004 | Knoeppel | B01J 31/0212 502/103 |
| 2004/0077803 A1* | 4/2004 | Marechal | B01J 19/1837 526/64 |
| 2004/0122191 A1 | 6/2004 | Arjunan et al. | |
| 2004/0127654 A1 | 7/2004 | Brant et al. | |
| 2004/0158011 A1* | 8/2004 | Jain | C08L 23/0815 526/160 |
| 2005/0119407 A1* | 6/2005 | Aarila | C08F 297/08 525/53 |
| 2005/0136274 A1* | 6/2005 | Hamulski | B32B 27/32 428/516 |
| 2005/0187367 A1 | 8/2005 | Hori et al. | |
| 2005/0200046 A1* | 9/2005 | Breese | B29C 55/023 264/288.4 |
| 2005/0238901 A1* | 10/2005 | Dalgleish | B32B 27/32 428/500 |
| 2005/0271868 A1* | 12/2005 | Myhre | C08F 210/16 428/220 |
| 2006/0014897 A1* | 1/2006 | Myhre | C08J 5/18 525/89 |
| 2006/0020096 A1 | 1/2006 | Schottek et al. | |
| 2006/0034777 A1 | 2/2006 | Mahling et al. | |
| 2006/0155080 A1 | 7/2006 | Fell et al. | |
| 2006/0182987 A1 | 8/2006 | Yu et al. | |
| 2006/0211801 A1 | 9/2006 | Miller et al. | |
| 2006/0211832 A1 | 9/2006 | Brant et al. | |
| 2007/0235896 A1 | 10/2007 | McLeod et al. | |
| 2007/0260016 A1* | 11/2007 | Best | B32B 27/32 525/240 |
| 2008/0057238 A1* | 3/2008 | Follestad | B32B 7/02 428/35.2 |
| 2008/0139749 A1* | 6/2008 | Lehtinen | C08J 5/18 525/240 |
| 2008/0214767 A1 | 9/2008 | Mehta et al. | |
| 2009/0048402 A1* | 2/2009 | Lynch | C08F 10/02 525/240 |
| 2010/0009156 A1* | 1/2010 | Daviknes | B32B 27/308 428/220 |
| 2010/0029883 A1* | 2/2010 | Krajete | C08F 210/16 526/352 |
| 2010/0081760 A1 | 4/2010 | Rhee et al. | |
| 2010/0099824 A1* | 4/2010 | Helland | C08J 5/18 525/240 |
| 2010/0130692 A1* | 5/2010 | Cham | C08J 5/18 525/240 |
| 2010/0130705 A1* | 5/2010 | Lindroos | C08F 10/00 526/65 |
| 2010/0304062 A1* | 12/2010 | Daviknes | B32B 27/32 428/35.2 |
| 2011/0028665 A1* | 2/2011 | Eriksson | C08F 210/16 526/90 |
| 2011/0031645 A1 | 2/2011 | Kuettel et al. | |
| 2011/0098422 A1* | 4/2011 | Li | B01J 31/2295 526/107 |
| 2012/0189830 A1* | 7/2012 | Niepelt | B32B 27/32 428/216 |
| 2013/0030121 A1 | 1/2013 | Alamo et al. | |
| 2013/0045862 A1 | 2/2013 | Valonen et al. | |
| 2013/0167486 A1* | 7/2013 | Aarnio | B32B 27/327 53/477 |
| 2013/0178573 A1 | 7/2013 | Paavilainen et al. | |
| 2013/0203908 A1 | 8/2013 | Kock et al. | |
| 2013/0203931 A1 | 8/2013 | Paavilainen et al. | |
| 2013/0236668 A1 | 9/2013 | Bernreitner et al. | |
| 2014/0005324 A1 | 1/2014 | Reichelt et al. | |
| 2015/0232589 A1* | 8/2015 | Best | B32B 27/32 428/500 |
| 2015/0251388 A1* | 9/2015 | Niedersuess | B32B 27/32 53/451 |
| 2015/0259487 A1* | 9/2015 | Denis | C08J 5/18 428/220 |
| 2015/0305256 A1* | 10/2015 | Motha | C08L 23/0815 239/547 |
| 2016/0185946 A1 | 6/2016 | Sandholzer et al. | |
| 2016/0194486 A1 | 7/2016 | Sandholzer et al. | |
| 2016/0200838 A1 | 7/2016 | Reznichenko et al. | |
| 2016/0208085 A1 | 7/2016 | Gloger et al. | |
| 2016/0237270 A1 | 8/2016 | Wang et al. | |
| 2016/0244539 A1 | 8/2016 | Resconi et al. | |
| 2016/0271917 A1* | 9/2016 | Nummila-Pakarinen | B32B 27/32 |
| 2016/0272740 A1 | 9/2016 | Wang et al. | |
| 2016/0280899 A1 | 9/2016 | Töltsch et al. | |
| 2016/0304681 A1 | 10/2016 | Potter et al. | |
| 2016/0311951 A1 | 10/2016 | Reichelt et al. | |
| 2016/0311988 A1 | 10/2016 | Potter et al. | |
| 2016/0312018 A1 | 10/2016 | Vestberg et al. | |
| 2016/0312019 A1 | 10/2016 | Lampela et al. | |
| 2016/0347943 A1 | 12/2016 | Wang et al. | |
| 2016/0347944 A1 | 12/2016 | Wang et al. | |

FOREIGN PATENT DOCUMENTS

| | | |
|---|---|---|
| CN | 103068574 A | 4/2013 |
| CN | 103080212 A | 5/2013 |
| CN | 103347951 A | 10/2013 |
| EP | 0 045 977 B1 | 1/1987 |
| EP | 0 260 130 A1 | 3/1988 |
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594-218 A1 | 4/1994 |
| EP | 0 279 586 B1 | 5/1994 |

(56) References Cited

FOREIGN PATENT DOCUMENTS

| | | |
|---|---|---|
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1961557 A1 * | 8/2008 ............. B32B 27/32 |
| EP | 1961558 A1 * | 8/2008 ............. B32B 27/32 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 487 203 A1 | 8/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| JP | 2013-525531 A | 6/2013 |
| JP | 2013-525532 A | 6/2013 |
| WO | WO 87/07620 A1 | 12/1987 |
| WO | WO 92/12182 A1 | 7/1992 |
| WO | WO 92/13029 A1 | 8/1992 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 94/10180 A1 | 5/1994 |
| WO | WO 94/14856 A1 | 7/1994 |
| WO | WO 95/12622 A1 | 5/1995 |
| WO | WO 95/32994 A1 | 12/1995 |
| WO | WO 97/10248 A1 | 3/1997 |
| WO | WO 97/14700 A1 | 4/1997 |
| WO | WO 97/28170 A1 | 8/1997 |
| WO | WO 97/36939 A1 | 10/1997 |
| WO | WO 98/12234 A1 | 3/1998 |
| WO | WO 98/16359 A1 | 4/1998 |
| WO | WO 98/38041 A1 | 9/1998 |
| WO | WO 98/40331 A1 | 9/1998 |
| WO | WO 98/46616 A1 | 10/1998 |
| WO | WO 98/47929 A1 | 10/1998 |
| WO | WO 98/49208 A1 | 11/1998 |
| WO | WO 98/56831 A1 | 12/1998 |
| WO | WO 98/58971 | 12/1998 |
| WO | WO 98/58976 A1 | 12/1998 |
| WO | WO 98/58977 A1 | 12/1998 |
| WO | WO 99/10353 A1 | 3/1999 |
| WO | WO 99/12981 A1 | 3/1999 |
| WO | WO 99/19335 A1 | 4/1999 |
| WO | WO 99/24478 A1 | 5/1999 |
| WO | WO 99/24479 A1 | 5/1999 |
| WO | WO 99/33842 A1 | 7/1999 |
| WO | WO 99/41290 A1 | 8/1999 |
| WO | WO 00/34341 A2 | 6/2000 |
| WO | WO 00/68315 A1 | 11/2000 |
| WO | WO 01/48034 A2 | 7/2001 |
| WO | WO 01/58970 A1 | 8/2001 |
| WO | WO 01/70395 A2 | 9/2001 |
| WO | WO 02/02576 A1 | 1/2002 |
| WO | WO 02/051912 A1 | 7/2002 |
| WO | WO 02/057342 A2 | 7/2002 |
| WO | WO 03/000754 A1 | 1/2003 |
| WO | WO 03/000755 A2 | 1/2003 |
| WO | WO 03/000756 A2 | 1/2003 |
| WO | WO 03/000757 A1 | 1/2003 |
| WO | WO 03/051934 A2 | 6/2003 |
| WO | WO 03/054035 A1 | 7/2003 |
| WO | WO 03/066698 A1 | 8/2003 |
| WO | WO 03/082879 A1 | 10/2003 |
| WO | WO 2004/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2009/092691 A1 | 7/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/052263 A1 | 5/2010 |
| WO | WO 2010/053644 A1 | 5/2010 |
| WO | WO 2010/082943 A1 | 7/2010 |
| WO | WO 2010/115878 A1 | 10/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/117032 A1 | 9/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |

(56) References Cited

FOREIGN PATENT DOCUMENTS

| WO | WO 2013/004507 A1 | 1/2013 | | |
|----|-------------------|--------|---|---|
| WO | WO 2013/007650 A1 | 1/2013 | | |
| WO | WO 2013/010879 A1 | 1/2013 | | |
| WO | WO 2013050119 A1 * | 4/2013 | ............ | B32B 27/32 |
| WO | WO 2013/092615 A1 | 6/2013 | | |
| WO | WO 2013/092620 A1 | 6/2013 | | |
| WO | WO 2013/092624 A1 | 6/2013 | | |
| WO | WO 2013/127707 A1 | 9/2013 | | |
| WO | WO 2014/023603 A1 | 2/2014 | | |
| WO | WO 2014/023604 A1 | 2/2014 | | |
| WO | WO 2015/022127 A1 | 2/2015 | | |
| WO | WO 2015/024887 A1 | 2/2015 | | |
| WO | WO 2015/024891 A1 | 2/2015 | | |
| WO | WO 2015/044116 A1 | 4/2015 | | |
| WO | WO 2015/052246 A1 | 4/2015 | | |
| WO | WO 2015/059229 A1 | 4/2015 | | |
| WO | WO 2015/059230 A1 | 4/2015 | | |
| WO | WO 2015/062936 A1 | 5/2015 | | |
| WO | WO 2015/075088 A1 | 5/2015 | | |
| WO | WO 2015/082379 A1 | 6/2015 | | |
| WO | WO 2015/091660 A1 | 6/2015 | | |
| WO | WO 2015/091829 A1 | 6/2015 | | |
| WO | WO 2015/091839 A1 | 6/2015 | | |
| WO | WO 2015/101593 A1 | 7/2015 | | |
| WO | WO 2015/107020 A1 | 7/2015 | | |
| WO | WO 2015/113907 A1 | 8/2015 | | |
| WO | WO 2015/117948 A1 | 8/2015 | | |
| WO | WO 2015/117958 A1 | 8/2015 | | |
| WO | WO 2015/121160 A1 | 8/2015 | | |
| WO | WO 2015/177094 A1 | 11/2015 | | |

OTHER PUBLICATIONS

Crimmino et al., "Thermal and mechanical properties of isotactic random propylene-butene-1 copolymers," *Polymer* 19:1222-1223 (1978).

Crispino et al., "Influence of Composition on the Melt Crystallization of Isotactic Random Propylene/1-Butene Copolymers," *Makromol. Chem.* 181:1747-1755 (1980).

Fujiyama et al., "Effect of Molecular Parameters on the Shrinkage of Injection-Molded Polypropylene," *J. Appl. Polym. Sci.* 22:1225-1241 (1978).

Galli et al., "Technology: driving force behind innovation and growth of polyolefins," *Prog. Polym. Sci.* 26:1287-1336 (2001).

"Glossary of Basic Terms in Polymer Science (IUPAC Recommendations 1996)," *Pure Appl. Chem.*, 68(8):1591-1595 (1996).

"MDO Film—Oriented PE and PP packaging film," IN0128/GB FF Oct. 2004, Borealis A/S (2004).

Atwood, "Chapter 6: Anionic and Cationic Organoaluminum Compounds," *Coord. Chem. Alum.*, VCH, New York, NY, pp. 197-232 (1993).

Britovsek et al., "The Search for New-Generation Olefin Polymerization Catalysts: Life beyond Metallocenes," *Angew. Chem, Int. Ed.*, vol. 38(4), pp. 428-447 (1999).

Busico et al., "Alk-1-ene Polymerization in the Presence of a Monocyclopentadienyl Zirconium(IV) Acetamidinate Catalyst: Microstructural and Mechanistic Insights$^a$," *Macromol. Rapid Commun.* 28:1128-1134 (2007).

Busico et al., "Full Assignment of the $^{13}$C NMR Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Castignolles et al., "Detection and quantification of branching in polyacrylates by size-exclusion chromatography (SEC) and melt-state $^{13}$C NMR spectroscopy," *Polymer*, 50(11):2373-2383, (2009).

Cheng, "$^{13}$C NMR Analysis of Ethylene-Propylene Rubbers," *Macromolecules* 17:1950-1955 (1984).

Filip et al., "Heteronuclear decoupling under fast MAS by a rotor-synchronized Hahn-echo pulse train," *J. Magnet. Reson.* 176:239-243 (2005).

Gahleitner et al., "Nucleation of Polypropylene Homo- and Copolymers," *International Polymer Processing* 26(1):2-20 (2011).

Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).

Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).

Holbrey et al., "Liquid clathrate formation in ionic liquid-aromatic mixtures," *Chem. Comm.*, 2003, pp. 476-477.

Kakugo et al., "$^{13}$C NMR Determination of Monomer Sequence Distribution in Ethylene-Propylene Copolymers Prepared with δ-TiCl$_3$—Al(C$_2$H$_5$)$_2$Cl," *Macromolecules* 15:1150-1152 (1982).

Klimke et al., "Optimisation and Application of Polyolefin Branch Quantification by Melt-State $^{13}$C NMR Spectroscopy," *Macromol. Chem. Phys.* 207(4):382-395 (2006).

Mcauley et al., "On-line Inference of Polymer Properties in an Industrial Polyethylene Reactor," *AlChE Journal*, vol. 37, No. 6, pp. 825-835 (1991).

Myhre et al., "Oriented PE films—Expanding Opportunities with Borstar® PE," Maack Speciality Films, pp. 1-10 (2001).

Parkinson et al., "Effect of Branch Length on $^3$C NMR Relaxation Properties in Molten Poly[ethylene-co-(α-olefin)] Model Systems," *Macromol. Chem. Phys.* 208(19-20):2128-2133 (2007).

Periodic Table (IUPAC 2007).

*Plastics Additives Handbook*, 5th edition, Hans Zweifel, Editor, Hanser Publishers, Munich, pp. 871-873 (2001).

*Plastics Additives Handbook*, 5th edition, Hans Zweifel, Editor, Hanser Publishers, Munich, pp. 956-965 (2001).

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

*Propylene Handbook*, $2^{nd}$ *Edition*, Chapter 7.2.2 "Oriented Films," pp. 405-415, Nello Pasquini, Editor, Hanser (2005).

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).

Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).

Resconi et al., "Highly Regiospecific Zirconocene Catalysts for the Isospecific Polymerization of Propene," JACS 120(10):2308-2321 (1998).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers—application of quantitative $^{13}$C NMR," *Polymer Testing* 28(5):475-479 (2009).

Spaleck et al., "The Influence of Aromatic Substituents on the Polymerization Behavior of Bridged Zirconocene Catalysts," *Organometallics* 13:954-963 (1994).

Spear et al., "Liquid Clathrates," *Encyclopedia of Supramolecular Chemistry*, J.L. Atwood and J.W. Steed (Eds.); Marcel Dekker: New York, pp. 804-808 (2004).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

European Patent Office, International Search Report in International Application No. PCT/EP2014/071559 (Nov. 17, 2014).

European Patent Office, Written Opinion in International Application No. PCT/EP2014/071559 (Nov. 17, 2014).

European Patent Office, International Preliminary Report on Patentability in International Application No. PCT/EP2014/071559 (Apr. 12, 2016).

(56) References Cited

OTHER PUBLICATIONS

European Patent Office, Decision to Grant a European Patent in European Application No. 13188255.7 (Mar. 3, 2016).
Koch et al., "Evaluation of scratch resistance in multiphase PP blends," *Polymer Testing* 26: 927-936 (2007).
State Intellectual Property Office of the People's Republic of China, First Notification of Office Action in Chinese Patent Application No. 201480052127.6 (Oct. 19, 2016).

* cited by examiner

MACHINE DIRECTION ORIENTED FILM FOR LABELS

CROSS-REFERENCE TO RELATED APPLICATIONS

This patent application is the U.S. national phase of International Application No. PCT/EP2014/071559, filed on Oct. 8, 2014, which claims the benefit of European Patent Application No. 13188255.7, filed Oct. 11, 2013, the disclosures of which are incorporated herein by reference in their entireties for all purposes.

FIELD OF THE INVENTION

The present invention is related to a machine direction oriented multilayer film suitable for preparing labels.

In particular, the invention concerns a multilayer film comprising a core layer of a bimodal terpolymer, e.g. a bimodal ethylene/1-butene/$C_6$-$C_{12}$-alpha-olefin terpolymer and two outer layers comprising HDPE.

DESCRIPTION OF PRIOR ART

It is general practice to apply labels to the surface of an item, such as a bottle or a container from polymer or glass, to provide decoration, and/or to display information about the product being sold, such as the content of the item, a trade name or logo.

Plastic labels, in contrast to paper labels, are increasingly preferred, for example due to their more appealing appearance (for example transparency), better mechanical properties and recyclability.

The plastic labels available include films made, for example, from polyvinyl chloride (PVC), polypropylene (PP) and polyethylene (PE). Different grades of PE have been synthesized and various ethylene polymers may be used in such films. Polyethylene grades include for example, high density polyethylene (HDPE), low density polyethylene (LDPE) and linear low density polyethylene (LLDPE).

A label consists of a label film, also called as a carrier, substrate or facestock layer, and an adhesive layer to affix the label film to an article. The label film is commonly coated on one side with the adhesive and usually printed at least on the other side.

Label films can be attached to an item by heat activated adhesive, wet glue adhesive or pressure sensitive adhesive (PSA).

The label films currently used are based on a single-layer (monolayer) as well as on multilayer polymer films having two or more film layers, which may comprise polymeric films having same or different film composition. The thickness of individual films in a multilayer structure may also vary.

Such label films are typically produced using either cast or blowing process, which are both well known processes in the prior art.

Non-oriented blown or cast PE films are very flexible and conformable, however they are often optically cloudy and in particular the blown films have poorer register control in the printing process due to the poorer gauge control of the film manufacturing process.

After the film has been formed, it can be stretched using basically two different methods—transverse-direction orientation (TDO) or machine-direction orientation (MDO). By combining the above mentioned orientation processes it is also possible to produce bi-axially oriented (BO) films.

Through the machine-direction orientation process, the film is uni-axially oriented in the machine direction of the web. Stretching in machine direction is normally done by means of a machine direction orienter via rolls with gradually increasing speed. These rolls are heated sufficiently to bring the film to a suitable temperature. Under these conditions, the film is stretched in the machine direction. Then the film is rapidly cooled to set the orientation of the film.

It is well known that orientation of the plastic films enhances their properties, particularly mechanical, barrier and optical properties Making use of the MDO films, the films can be down-gauged to lower thicknesses and good optical clarity may be achieved whilst at the same time maintaining good conformability due to the fact that orientation is only carried out in the machine direction. Good conformability is essential with plastic films for label products, thus it allows labelling without wrinkles to the surface of the substrate which are often significantly curved in two directions.

In principle such machine direction oriented multilayer films are well known.

For example WO2006086134 discloses a multilayer thin film, which comprises at least one layer of a linear low density polyethylene (LLDPE) and at least one layer of a high density polyethylene (HDPE) or a medium density polyethylene (MDPE). This thin film is made by machine-direction orientation (MDO) from a thick, multilayer film. The multilayer thin film has a thickness within the range of 0.1 mil to 1 mil and a normalized MD tear strength of 44 grams/mil or greater. The LLDPE used had a density between 865 to 925 kg/m$^3$ Labels, respectively label films are not mentioned.

In the Brochure MDO Film—Oriented PE and PP Packaging film, IN0128/GB FF 2004 10, 2004, Borealis A/S; several film recipes are described. On page 5 for example a film consisting of HDPE polymer VS4531 (Borealis grade, density 952 kg/m$^3$, MFR$_2$ 0.63 g/10 min) and Borecene™ FM5220 (mLLDPE; unimodal metallocene polyethylene grade from Borealis) in layer (A) and "Borstar PE" in layer (B) is described.

This ABA film, which is used as candy wrap film, is produced by first coextruding the 3 layers and then stretching the film into machine direction with a draw ratio of 1:7.5.

In a further publication "Oriented PE films Expanding Opportunities with Borstar® PE; O. J. Myhre, L. Klimek, A. Kreiner," Maack Speciality Films 2001, pp 1-10; a similar film, i.e. a film consisting of a A/B/A co-extruded film, which was subsequently stretched into machine direction with a draw ratio of 1:7.5, is described. In this case layers A consist of HDPE polymer VS4531 and layer B consists of Borstar® FB2230 (linear low density PE, density 923 kg/m$^3$). Again the film is used as candy wrap film.

In this publication also a machine direction oriented monolayer label film consisting of only VS4531 is disclosed.

It is also state of the art to use non-oriented polyethylene blown films made of low density polyethylene with a film thickness of 85 μm as label films. (e.g. see GoogleBooks: Plastic Films: Situation and Outlook: a Rapra Market report by Francoise Pardos). Such films are sold i.a. by Orbita, RKW, Mondi, KWH, Raflatac and Avery Dennison.

Although many solutions for label films are offered in the market, there is still a need for new solutions providing materials which allow down-gauging and show advantageous properties like high stiffness for easy dispensing and easy punchability, increased display properties (like good haze, gloss and transparency), high conformability, good printability and which are additionally 100% recyclable.

SUMMARY OF THE INVENTION

It is an object of the present invention to provide a multilayer film which shows all of these desired properties, thus being especially suitable as label film.

It has surprisingly been found that a machine direction oriented multilayer film comprising three layers, with a core layer, comprising a bimodal terpolymer and two HDPE-outer layers, can fulfil all these requirements.

Thus the present invention provides according to one embodiment a machine direction oriented multilayer film suitable for labels, which comprises a core layer (C) and two outer layers (O-1, O-2) sandwiching the core layer, wherein (i) the core layer (C) comprises a bimodal ethylene/1-butene/$C_6$-$C_{12}$-alpha-olefin terpolymer, with a density between 926 kg/m³ to 950 kg/m³ and (ii) the two outer layers comprising unimodal HDPE with a density of more than 940 kg/m³ up to 970 kg/m³.

In a second embodiment said multilayer film is in the form of a stretched film which is uniaxially oriented in the machine direction (MD) in a draw ratio of 1:4 to 1:12.

In a third embodiment the machine direction oriented film has a final thickness of at least 25 µm up to 85 µm.

The term "multilayer film is in the form of a stretched film which is uniaxially oriented in the machine direction (MD)" means that the film is oriented, i.e. stretched, uniaxially to at least 4 times its original length in the machine direction during its manufacture, before the use as label film. Also preferably, the film is oriented only uniaxially in MD. Thus the film of the invention preferably excludes films oriented biaxially in MD and in TD, i.e. transverse direction.

Due to the plastic film composition and orientation in machine direction important properties of the film for labelling applications are improved, such as die-cutting and matrix stripping properties, bending stiffness, clarity and conformability of the film. Improved film properties are also essential for assuring dispensability of labels in automatic labelling.

According to a further embodiment of the invention the film may be used for label products and for labelling of items. The label products may be attached to a substrate surface such as glass or plastic bottles.

According to another further embodiment of the invention the label product is a preferably a pressure sensitive label, a linerless label, a heat shrink sleeve label or a heat seal label, more preferably a pressure sensitive label or a heat shrink sleeve label and most preferably a pressure sensitive label.

Some objects of this invention are to produce more cost-effective, thin labels with better performance and optimal mechanical properties, that are for example well conformable, printable, die-cuttable at low pressures, and used in automated labelling lines. These goals can be reached with the novel multilayer structure of the present invention.

DETAILED DESCRIPTION OF THE INVENTION

The machine direction oriented multilayer film according to the present invention comprises two outer layers and a core layer, which is sandwiched between the two outer layers, whereby the film is purely polyethylene based.

Core Layer

The core layer (C) comprises a bimodal ethylene/1-butene/$C_6$-$C_{12}$-alpha-olefin terpolymer.

Suitable terpolymers comprise (A-1) a lower molecular weight (LMW) component of a homopolymer of ethylene and (A-2) a higher molecular weight component (HMW) of a terpolymer of ethylene, 1-butene and a $C_6$-$C_{12}$-alpha-olefin.

The polyethylene component in this core layer must be bimodal, i.e. its molecular weight profile does not comprise a single peak but instead comprises the combination of two peaks (which may or may not be distinguishable) centred about different average molecular weights as a result of the fact that the polymer comprises two separately produced components.

Bimodal polyethylenes are typically made in more than one reactor each having different conditions. The components are typically so different that they show more than one peak or shoulder in the diagram usually given as result of its GPC (gel permeation chromatograph) curve, where d(log (MW)) is plotted as ordinate vs log(MW), where MW is molecular weight.

Thus, the bimodal polyethylene comprises a higher molecular weight component which corresponds to an ethylene terpolymer and a lower molecular weight component which corresponds to an ethylene homopolymer.

Preferably the $C_6$-$C_{12}$-alpha-olefins are selected from the group of 1-hexene, 4-methyl-1-pentene, 1-octene and 1-decene.

More preferably the polyethylene in the core layer is formed from an ethylene homopolymer and an ethylene butene/hexene terpolymer or ethylene butene/octene terpolymer.

Such bimodal polymers may be prepared for example by two stage polymerisation or by the use of two different polymerisation catalysts in a one stage polymerisation. It is also possible to employ a dualsite catalyst. It is important to ensure that the higher and lower molecular weight components are intimately mixed prior to extrusion to form a film. This is most advantageously achieved by using a multistage process or a dual site catalyst, but could be achieved also through blending.

To maximise homogeneity, particularly when a blend is employed, it is preferred that the bimodal polyethylene used in the core layer is extruded prior to being extruded to form the film of the invention. This pre-extrusion step ensures that the higher molecular weight component will be homogeneously distributed though the core layer and minimises the possibility of gel formation in the film.

Preferably the bimodal polyethylene is produced in a multi-stage polymerisation using the same catalyst, e.g. a metallocene catalyst or preferably a Ziegler-Natta catalyst. Thus, two slurry reactors or two gas phase reactors could be employed. Preferably however, the bimodal polyethylene is made using a slurry polymerisation in a loop reactor followed by a gas phase polymerisation in a gas phase reactor.

A loop reactor—gas phase reactor system is well known as Borealis technology, i.e. a BORSTAR® reactor system. The bimodal polyethylene in the core layer is thus preferably formed in a two stage process comprising a first slurry loop polymerisation followed by gas phase polymerisation in the presence of a Ziegler-Natta catalyst.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may if desired be effected under supercritical conditions. Slurry polymerisation may also be carried out in bulk where the reaction medium is formed from the monomer being polymerised.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a nonreactive gas such as nitrogen or low boiling point hydrocarbons such as propane together with monomer (e.g. ethylene).

Preferably, the lower molecular weight component is produced in a continuously operating loop reactor where ethylene is polymerised in the presence of a polymerisation catalyst as stated above and a chain transfer agent such as hydrogen. The diluent is typically an inert aliphatic hydrocarbon, preferably isobutane or propane.

The higher molecular weight component can then be formed in a gas phase reactor using the same catalyst.

Where the higher molecular weight component is made as a second step in a multistage polymerisation it is not possible to measure its properties directly. However, e.g. for the above described polymerisation process of the present invention, the density, $MFR_2$ etc. of the HMW component can be calculated using Kim McAuley's equations.

Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor are calculated.

The bimodal terpolymer used according to the invention comprises a lower molecular weight component (LMW) of a homopolymer of ethylene and a higher molecular weight component (HMW) of a terpolymer of ethylene, 1-butene and a $C_6$-$C_{12}$-alpha-olefin.

The expression "homopolymer of ethylene" used herein refers to a polyethylene that consists substantially, i. e. to at least 98% by weight, preferably at least 99% by weight, more preferably at least 99.5% by weight, most preferably at least 99.8% by weight of ethylene.

As stated above the higher alpha-olefin comonomers are preferably $C_6$-$C_{12}$-alpha-olefins selected from the group of 1-hexene, 4-methyl-1-pentene, 1-octene and 1-decene.

More preferably 1-hexene or 1-octene, most preferably 1-hexene is used as second comonomer beside 1-butene.

Such bimodal terpolymers are known in the state of the art and are described e.g. in WO 03/066698 or WO 2008/034630 or are commercially available, such as BorShape™ FX1001 and BorShape™ FX1002 (both from Borealis AG, Vienna, Austria)

The lower molecular weight component (LMW) of the ethylene homopolymer has a weight average molecular weight preferably in the range of 20 000 to 50 000 g/mol, more preferably of 25 000 to 40 000 g/mol and a melt index $MFR_2$ in the range of 50 to 3 200 g/10 min, preferably in the range of 80 to 1 000 g/10 min and more preferably in the range of 100 to 600 g/10 min.

The density of the lower molecular weight component may range from 930 to 980 kg/m³, preferably from 940 to 975 kg/m³, more preferably 960 to 972 kg/m³.

The lower molecular weight component has preferably from 30 to 70 wt %, e.g. 40 to 60% by weight of the bimodal polyethylene with the higher molecular weight component forming 70 to 30 wt %, e.g. 60 to 40% by weight.

The higher molecular weight component has a lower $MFR_2$ and a lower density than the lower molecular weight component.

The final bimodal terpolymer has a weight average molecular weight preferably in the range of 100 000 to 200 000 g/mol, and a Mw/Mn in the range of 5 to 20, preferably in the range of 8 to 18, more preferably in the range of 10 to 15.

The density of the final terpolymer is between 926 and 950 kg/m³, preferably between 927 to 945 kg/m³, and more preferably between 930 to 940 kg/m³.

Preferred terpolymers have a melt index ($MI_5$) of 0.1 to 20 g/10 min (e.g. when measured at 190° C. and 5.0 kg, according to standard ASTM D1238), especially from 0.2 to 10 or from 0.5 to 5 g/10 min, e.g. around 2.0 g/10 min.

Preferred terpolymers have a melt index ($MI_2$) of 0.01 to 6 g/10 min (e.g. when measured at 190° C. and 2.16 kg, according to standard ASTM D1238), especially from 0.05 to 3 or from 0.1 to 2 g/10 min, e.g. around 0.5 g/10 min.

The overall comonomer content in the total polymer is 0.3 to 7.0% by mol, preferably 0.6 to 4.5% by mol, more preferably 1.0 to 3.5% by mol and most preferably 1.2 to 2.3% by mol.

Butene is present in an amount of 0.1 to 3.0% by mol, preferably 0.2 to 2.0% by mol, more preferably 0.3 to 1.5% by mol and most preferably 0.4 to 0.8% by mol.

The $C_6$ to $C_{12}$ alpha olefin is present in an amount of 0.2 to 4.0% by mol, preferably 0.4 to 2.5% by mol, more preferably 0.7 to 2.0% by mol and most preferably 0.8 to 1.5% by mol.

In addition to the bimodal terpolymer the composition may also contain antioxidants, process stabilizers, slip agents, pigments, UV-stabilizers and other additives known in the art.

Examples of stabilizers are hindered phenols, hindered amines, phosphates, phosphites and phosphonites.

Examples of pigments are carbon black, ultra marine blue and titanium dioxide.

Examples of other additives are e. g. clay, talc, calcium carbonate, calcium stearate, zinc stearate and antistatic additives like.

The additives can be added as single components or as part of a masterbatch as is known in the art.

In one embodiment it is preferred to add a pigment, preferably titanium dioxide to obtain white films, providing better contrast on e.g. blue bottles. Most preferably this pigment is added as part of a masterbatch.

Sandwiching Layers

As identified above, the three-layer structure in accordance with the present invention comprises in addition to the core layer two layers sandwiching the core layer The layers sandwiching the core layer are layers directly contacting the core layer, preferably without any adhesive layer or surface treatment applied.

The two outer layers which are sandwiching the core layer both comprise unimodal HDPE. HDPEs of use in the invention have a density of more than 940 kg/m³ and can be homopolymers or copolymers with at least one α-olefin having from 3 to 10 carbon atoms. Suitable HDPE preferably has a density within the range of about 941 kg/m³ to about 970 kg/m³. More preferably, the density is within the range of about 945 kg/m³ to about 965 kg/m³.

The HDPE polymer to be employed in accordance with the present invention may be a known and e.g. commercially available, polyethylene polymer or said HDPE polymer may be prepared using any coordination catalyst, typically ZN catalysts, Cr-catalyst as well as single site catalysts (SSC).

The melt flow rate (MFR) of the HDPE polymer to be employed for the outer layers in accordance with the present invention is not critical and can be varied depending on the mechanical properties desired for an end application. In one preferable embodiment $MFR_2$ value in the range of from 0.05 to 10 g/10 min, preferably 0.1 to 7.0 g/10 min, more preferably from 0.2 to 5.0 g/10 min, yet more preferably 0.3 to 3.0 g/10 min, even more preferably 0.4 to 2.0 g/10 min an most preferably 0.5 to 1.3 g/10 min are desired.

The molecular weight distribution (MWD) expressed as Mw/Mn of the HDPE polymer to be employed in accordance with the present invention can vary in a broad range. MWD is preferably in the range from 2 to 20, preferably 2.5 to 15, more preferably 3 to 10 and most preferably 3.5 to 7.

HDPEs are very well known and are commercially available or can be prepared using well-documented polymerisation processes, e.g. processes described above and by adjusting the process conditions to obtain the desired density of HDPE.

Thus the HDPE polymers to be employed in accordance with the present invention may be produced in principle using any polymerization method, including solution, slurry and gas phase polymerization.

I. a. commercial grades of HDPEs as highly feasible materials for layer(s) of the invention, like commercial grades available from Borealis e.g. VS4470, and Reliance's commercial grades, e.g. F46003, can be mentioned as examples only, i.e. not limiting thereto.

The outer layers may also contain other polymer components if necessary and may also contain minor amounts of conventional additives such as antioxidants, UV stabilisers, acid scavengers, nucleating agents, anti-blocking agents, slip agents etc as well as polymer processing agent (PPA). The additives can be added as single components or as part of a masterbatch as is known in the art.

Other Layers

The film of the invention may also contain further layers in addition to the main three layers defined in the invention.

The optional additional layers are naturally selected so that they have no adverse effect on the inventive effect achieved with the three-layer structure according to the invention.

Thus it is also possible to use the three-layer structure of the present invention for producing a 5- or even 7-layered film.

However, the three-layer structure in accordance with the present invention preferably is employed as such, without any further film material.

Three-Layer Structure

The three-layer structure in accordance with the present invention may be prepared by any conventional film extrusion procedure known in the art, e.g. with blown film extrusion. Preferably, the three-layer film is formed by blown film extrusion, more preferably by coextrusion processes, which in principle are known and available to the skilled person. Typical processes for preparing a three-layer structure in accordance with the present invention are extrusion processes through an angular die, followed by blowing into a tubular film by forming a bubble which is collapsed between the rollers after solidification. This film can then be slid, cut or converted, such as by using a gazette head, as desired. Conventional film production techniques may be used in this regard. Typically the core layer and the sandwiching layers are coextruded at a temperature in the range of from 160 to 240° C. and cooled by blowing gas (generally air) at a temperature of 5 to 50° C., to provide a frost line height of 1 or 2 to 8 times the diameter of the dye. The blow up ratio can be in the range of from 1 (1:1) to 4 (1:4), preferably 1.5 (1:1.5) to 3.5 (1:3.5), more preferably from 2 (1:2) to 3 (1:3).

The film preparation process steps of the invention are known and may be carried out in one film line in a manner known in the art. Such film lines are commercially available, for example from Windmöller & Hölscher, Reifenhauser, Hosokawa Alpine, e.t.c.

Typically the three-layer structure (ABA) is produced on a 3-layer coextrusion line, but in some embodiments it may be appreciated that the used coextruder is a 5 or 7 layer coextrusion line. In such a set up the central dies may all extrude B-layer material to form an ABBBA or ABBBBBA type film or each of the two, respectively three outer dies may extrude A-layer material to form an AABAA or AAABAAA type film or as a combination of the before described possibilities an AABBBAA type film could be produced, too. As all these A-repectively B-layers are identical, the films produced are effectively still ABA films. Preferably 5-layer coextrusion lines would be used if desired, with ABBBA being the preferred type of film structure.

The multilayer film is then uniaxially oriented in the machine (or processing) direction. During the MDO, the film from the blown-film line or other film process is heated to an orientation temperature. Preferably, the temperature range for orientation can be 25K below the VICAT A-level of the outer film layer material up to the melting temperature of the outer film layer material. The heating is preferably performed utilizing multiple heating rollers.

Next, the heated film is fed into a slow drawing roll with a nip roller, which has the same rolling speed as the heating rollers. The film then enters a fast drawing roll. The fast drawing roll has a speed that is 2 to 10 times faster than the slow draw roll, which effectively orients the film on a continuous basis.

The oriented film then enters annealing thermal rollers, which allow stress relaxation by holding the film at an elevated temperature for a period of time.

The annealing temperature is preferably within the same temperature range as used for stretching or slightly below (e.g. 10 to 20K below), with room temperature being the lower limit. Finally, the film is cooled through cooling rollers to an ambient temperature.

The ratio of the film thickness before and after orientation is called "drawdown ratio."

The drawdown ratio varies depending on many factors including the desired film thickness, film properties, and multilayer film structures.

Preferably, the draw-down ratio is such that the film is at or near maximum extension. Maximum extension is the draw-down film thickness at which the film cannot be drawn further without breaking. The film is said to be at maximum extension when machine direction (MD) tensile strength has a less than 100% elongation at break under ASTM D-882.

The preparation process of a uniaxially oriented in MD multilayer film of the invention comprises at least the steps of forming a layered film structure and stretching the obtained multilayer film in the machine direction in a draw ratio of at least 1:4 up to 1:12, preferably 1:4.5 to 1:10 and more preferably 1:5 to 1:7.

The film is stretched at least 4 times up to 12 times, its original length in the machine direction. This is stated herein as a draw ratio of at least 1:4, i.e. "1" represents the original length of the film and "4" denotes that it has been stretched to 4 times that original length.

An effect of stretching (or drawing) is that the thickness of the film is similarly reduced. Thus a draw ratio of at least 1:4 preferably also means that the thickness of the film is at least four times less than the original thickness.

The films of the invention have an original thickness of 100 to 400 μm before stretching, preferably 150 to 380 μm and more preferably 200 to 350 μm.

After stretching, the final thickness of the uniaxially oriented films according to this invention is typically in the range 25 to 85 μm, preferably 30 to 70 μm, and more preferably 40 to 60 μm.

The outer layers and core layer may all be of equal thickness or alternatively the core layer may be thicker than each outer layer. A convenient film comprises two outer layers which each form 10 to 35%, preferably 15 to 30% of the total final thickness of the 3-layered film, the core layer forming the remaining thickness, e.g. 30 to 80%, preferably 40 to 70% of the total final thickness of the 3-layered film.

The three-layer structure according to the invention presents a polyethylene film which can be down-gauged by more than 20%, preferably more than 30% and even more preferred by more than 35% in comparison with a standard PE blown film made of low density polyethylene with 85 μm.

Furthermore the three-layer structure according to the invention has better display properties compared to such a standard PE blown film.

Compared to the machine direction oriented monolayer label film consisting of only VS4531, the three-layer structure according to the invention has the advantage of improved processability during producing the blown film and during the machine direction orientation process and better overall quality of the film. The main benefit of the multilayer film according to the invention compared to this monolayer label film is its down-gauging-ability.

Compared to A/B/A co-extruded films, consisting of HDPE polymer VS4531 A-layers and Borstar® FB2230 (linear low density PE, density 923 kg/m$^3$) B-layer, the three-layer structure according to the invention has the advantage of higher stiffness and improved punchability.

The three-layer films according to the invention furthermore possess an excellent printability, higher stiffness for easy dispensing and better punchability, high conformability, very good display properties, like high gloss and low haze (for transparent films) and are additionally 100% recyclable, since they are of 100% of polyethylene.

The films according to the invention are therefore i.a. highly suitable as label films and may be therefore used for label products and for labelling of items. The label products may be attached to a substrate surface such as glass or plastic bottles. Suitable label products are preferably a pressure sensitive label, a linerless label, a heat shrink sleeve label or a heat seal label, more preferably a pressure sensitive label or a heat shrink sleeve label and most preferably a pressure sensitive label.

Experimental Part

1. Methods

The following methods were used to measure the properties that are defined generally above and in examples below. Unless otherwise stated, the film samples used for the measurements and definitions were prepared as described under the heading "Film Sample Preparation".

Impact resistance on film (DDI) was determined by Dart-drop (g/50%). Dart-drop was measured using ISO 7765-1, method "A". A dart with a 38 mm diameter hemispherical head was dropped from a height of 0.66 m onto a film clamped over a hole. If the specimen failed, the weight of the dart was reduced and if it did not fail the weight was increased. At least 20 specimens were tested. The weight resulting in failure of 50% of the specimens was calculated.

MFR2: ISO1133 at 190° C. at a load of 2.16 kg
MFR5: ISO1133 at 190° C. at a load of 5 kg
MFR21: ISO1133 at 190° C. at a load of 21.6 kg Density of the materials was measured according to ISO 1183-1(2004): method A. The test specimens were produced according to ISO 1872-2. The cooling rate of the plaques when crystallising the samples was 15 C/min. Conditioning time was 16 hours at 23° C.

Tensile Tests (Modulus, Strength, Elongation at Break)

Tensile modulus and tensile strength were measured in machine and transverse direction according to ISO 527-3 on film samples prepared as described under the Film Sample preparation with film thickness as given for each test in below Table 1 at a cross head speed of 1 mm/min for the modulus and 50 mm/min for the strength.

Elongation at break in machine and transverse direction was determined according to ISO 527-3 on the same kind of specimens using a cross head speed of 50 mm/min.

Test speed was changed after a deformation of 0.25%.

Specimen type 2 acc. ISO 527-3: stripes with a width of 15 mm and length: 200 mm Thickness of the samples was 53 μm for Inventive Examples and 85 μm for the Comparative Example.

Gloss was measured according to ASTM D 2457. (measured outside, lengthwise, measuring angel 20°)

Haze was measured according to ASTM 1003.

The following examples illustrate the present invention.

2. Examples

The following materials have been used:

Core layer: as bimodal terpolymer Grade BorShape™ FX1002 (Borealis Polyolefine AG-Vienna, Austria) was used. FX1002 is a bimodal Ziegler Natta produced terpolymer ($C_2$/$C_4$/$C_6$) with MFR$_5$ of 2.0 g/10 min, density of 937 kg/m$^3$.

In Inventive Example 1 15 wt % of Polywhite® NG 8600 H1 provided by A. Schulman (white masterbatch containing 60% $TiO_2$ (Rutil-Type) in polyethylene) was added to the terpolymer.

Outer layers: as unimodal HDPE grade VS4470 (Borealis Polyolefine AG-Vienna, Austria) was used. VS4470 is a unimodal Ziegler Natta produced high density polyethylene with MFR$_2$ of 0.65 g/10 min and density of 947 kg/m$^3$ In addition as polymer processing agent Polybatch® AMF 705 HF provided by A. Schulman was added.

Comparative Example: Himod™ FT7324 (Borealis Polyolefine AG-Vienna, Austria) was used. FT7324 is a tubular, low density polyethylene grade with MFR$_2$ of 4.0 g/10 min and density of 932 kg/m$^3$ The following film structures have been prepared:
(xx %, like 25%, mean the percentage of the thickness of the three layer structure of each separate layer form, relative to the final thickness)

Comparative Example 1

MONOLAYER FILM with film thickness of 85 μm
FT7324 was converted into a monolayer film with a thickness of 85 μm on 200 mm die with 1.5 mm die gap. The film was produced by a low stalk technique with a blow-up ratio (BUR) of 1:3. This film is not machine-direction oriented and it is representative of the incumbent film used in high tensile strength, thin film applications for label films.
The film properties are listed in Table 1

Inventive Example 1: Final Film Thickness 53 μm

Outer layer (O-1): 20%: 98 wt % VS4470+2 wt % Polybatch® AMF 705 HF
Core layer (C): 60%: 85 wt % bimodal terpolymer FX1002+15 wt % Polywhite® NG 8600 H1
Outer layer (O-2): 20%: 98 wt % VS4470+2 wt % Polybatch® AMF 705 HF Inventive Example 2: Final Film Thickness 53 μm Outer layer (O-1): 20%: 98 wt % VS4470+2 wt % Polybatch® AMF 705 HF
Core layer (C): 60%: 100 wt % bimodal terpolymer FX1002
Outer layer (O-2): 20%: 98 wt % VS4470+2 wt % Polybatch® AMF 705 HF Film Sample Preparation Inventive Film Samples were produced by coextrusion on a commercially available 3-layer coextrusion blown film line with die diameter 500 mm, frost line height 3DD, at a blow up ratio (BUR) 1:2.4 and die gap 2.25 mm, with internal bubble cooling.

The extruder comprised three extruders in parallel (70/105/70)

Extruder temp setting: 210° C. to form 3-layered film with a relative layer thickness distribution of 20:60:20 relative to the final thickness Take off speed was 7.5 m/min and the roll width was 1900 mm.

The machine direction orientation was performed on a commercially available MDO unit. The unit consists of preheating, drawing, annealing, and cooling sections, with each set at specific temperatures to optimize the performance of the unit and produce films with the desired properties. The heating was at 105° C., the stretching was done at 125° C., cooling and annealing was done at 110° down to 40° C.

Inlet speed was 7.5 m/min, outlet speed was then 45 m/min. Drawdown ratio (DDR) was around 1:6.1.

TABLE 1

| Method | Unit | Example 1 | Example 2 | Comparative Example |
|---|---|---|---|---|
|  |  | DDR 1:6.151 | DDR 1:6.138 | — |
|  |  | 53 μm | 53 μm | 85 μm |
|  |  | white | transparent | transparent |
| Tensile Modulus MD | MPa | 1243 | 1263 | 310 |
| Tensile Modulus TD | MPa | 1259 | 1306 | 360 |
| Tensile Strength MD | MPa | 186 | 193 | 19 |
| Tensile Strength TD | MPa | 28.8 | 29.4 | 14.9 |
| Elongation at break MD | % | 43 | 48 | 120 |
| Elongation at break TD | % | 330 | 488 | 229 |
| DDI | g/μm | 1.2 | 1.2 | 1.9 |
| Haze | % | 103.0 | 4.4 | 9.8 |
| Gloss | % | 71 | 110 | 100 |

The invention claimed is:

1. A machine direction oriented multilayer film suitable for labels comprising a core layer (C) and two outer layers (O-1, O-2) sandwiching the core layer, wherein
   (i) the core layer (C) comprises a bimodal polyethylene polymer comprising a lower molecular weight component and a higher molecular weight component, which is produced by utilizing a Ziegler-Natta catalyst, with a density between 926 kg/m$^3$ to 950 kg/m$^3$ according to ISO 1183, (method A), wherein the bimodal polymer contains an ethylene/1-butene/$C_6$-$C_{12}$-alpha-olefin terpolymer and 1-butene in amount of 0.1 to 3.0 mol % and $C_6$-$C_{12}$-alpha-olefin in amount of 0.2 to 4.0 mol % in relation to the bimodal polymer, and
   (ii) the two outer layers comprising unimodal HDPE with a density of more than 940 kg/m$^3$ up to 970 kg/m$^3$.

2. The multilayer film according to claim 1, wherein the film is in the form of a stretched film which is uniaxially oriented in the machine direction (MD) in a draw ratio of 1:4 to 1:12.

3. The multilayer film according to claim 1, wherein the machine direction oriented film has a final thickness of at least 25 μm up to 85 μm.

4. The multilayer film according to claim 1, wherein
   (A-1) the lower molecular weight component being a homopolymer of ethylene
   (A-2) the higher molecular weight component being the terpolymer of ethylene, 1-butene, and a $C_6$-$C_{12}$-alpha-olefin.

5. The multilayer film according to claim 1, wherein the $C_6$-$C_{12}$-alpha-olefin is selected from the group of 1-hexene, 4-methyl-1-pentene, 1-octene and 1-decene.

6. The multilayer film according to claim 4, wherein the bimodal polymer having a melt flow rate MFR$_2$ according to ISO 1133 (190° C., 2.16 kg) of 0.01 to 6 g/10 min, a MFR$_5$ according to ISO 1133 (190° C., 5 kg) of 0.1 to 20 g/10 min, and an overall comonomer content of 0.3 to 7% by mol, wherein
   the lower molecular weight component of the bimodal polymer has a melt index MFR$_2$ according to ISO 1133 (190° C., 2.16 kg) of 50 to 3200 g/10 min, a density according to ISO 1183, (method A) of 930 to 980 kg/m3, and the amount of the lower molecular weight component in the bimodal polymer is in the range of 30 to 70 wt %.

7. The multilayer film according to claim 1, wherein the unimodal high density polyethylene of the outer layers (O-1, O-2) comprises a MFR$_2$ according to ISO 1133 (190° C., 2.16 kg) of 0.05 to 10 g/10 min, a density according to ISO 1183, (method A) of 941-970 kg/m$^3$, and a MWD between 2 and 20.

8. The multilayer film according to claim 1, wherein the core layer and/or the outer layers contain one or more of antioxidants, process stabilizers, polymer processing agents, pigments, UV-stabilizers, clay, talc, calcium carbonate, calcium stearate, zinc stearate, and antistatic additives in the form of a single components or as part of a masterbatch.

9. The multilayer film according to claim 8, wherein the core layer contains a pigment as part of a masterbatch.

10. The multilayer film according to claim 1, having a original thickness before being machine direction oriented of 100 to 400 μm.

11. The multilayer film according to claim 1, wherein the outer layers and core layer are all of equal thickness or alternatively each outer layer forms 10 to 35% of the total final thickness of the multilayered film and the core layer forms 30 to 80% of the total final thickness of the multilayered film.

12. A process for producing a multilayer film according to claim 1, wherein the multilayer film is first formed by a blown film coextrusion process with subsequent uniaxial orientation in machine direction.

13. The process according to claim 12, wherein the blown film coextrusion process is performed either on a 3-layer coextrusion line or on a 5- or 7-layer coextrusion line, where the central dies all extrude B-layer material to form an ABBBA or ABBBBBA type film or each of the two, respectively three outer dies extrude A-layer material to form an AABAA or AAABAAA type film or as a combination of the before described possibilities an AABBBAA type film is produced, whereby the so produced films are still ABA films as all A- respectively B-layers are identical.

14. A label comprising the multilayer structure according to claim 1.

15. The label according to claim 14, which is a pressure sensitive label, a linerless label, or a heat shrink sleeve label.

* * * * *